(12) United States Patent
Wickersham et al.

(10) Patent No.: US 11,236,908 B2
(45) Date of Patent: Feb. 1, 2022

(54) FUEL STAGING FOR ROTATING DETONATION COMBUSTOR

(71) Applicant: General Electric Company, Schenectady, NY (US)

(72) Inventors: Andrew Joseph Wickersham, Niskayuna, NY (US); Sarah Marie Monahan, Latham, NY (US); Thomas Michael Lavertu, Ballston Lake, NY (US); Kapil Kumar Singh, Rexford, NY (US)

(73) Assignee: General Electric Company, Schenectady, NY (US)

( * ) Notice: Subject to any disclaimer, the term of this patent is extended or adjusted under 35 U.S.C. 154(b) by 344 days.

(21) Appl. No.: 16/169,645

(22) Filed: Oct. 24, 2018

(65) Prior Publication Data

US 2020/0132020 A1 Apr. 30, 2020

(51) Int. Cl.
*F23R 7/00* (2006.01)
*F23R 3/34* (2006.01)

(52) U.S. Cl.
CPC . *F23R 7/00* (2013.01); *F23R 3/34* (2013.01)

(58) Field of Classification Search
CPC ...... F23R 7/00; F23R 3/34; F23R 3/50; F23R 2900/00015
See application file for complete search history.

(56) References Cited

U.S. PATENT DOCUMENTS

| 3,240,010 | A | * | 3/1966 | Morrison | F23R 7/00 |
| | | | | | 60/213 |
| 3,584,811 | A | | 6/1971 | Bramhall et al. | |
| 3,588,298 | A | * | 6/1971 | Morrison et al. | F23R 7/00 |
| | | | | | 60/39.77 |
| 3,971,209 | A | | 7/1976 | de Chair | |
| 5,054,280 | A | * | 10/1991 | Ishibashi | F23R 3/34 |
| | | | | | 60/776 |
| 5,522,217 | A | | 6/1996 | Zauner | |
| 5,619,855 | A | * | 4/1997 | Burrus | F23R 3/02 |
| | | | | | 60/736 |

(Continued)

FOREIGN PATENT DOCUMENTS

GB 1069217 A * 5/1967 ............... F02C 5/10

OTHER PUBLICATIONS

Rankin et al "Overview of Performance, Application, and Analysis of Rotating Detonation Engine Technologies", Journal of Propulsion and Power vol. 33, No. 1, Jan.-Feb. 2017, pp. 131-143. (Year: 2017).*

*Primary Examiner* — Ted Kim
(74) *Attorney, Agent, or Firm* — Venable LLP; Jacqueline A. DiRamio; Michele V. Frank

(57) ABSTRACT

A combustion system includes an annular tube disposed between an inner wall and an outer wall, the annular tube extending from an inlet end to an outlet end; at least one fluid inlet disposed in the annular tube proximate the inlet end, the fluid inlet providing a conduit through which fluid flows into the annular tube; at least one outlet disposed in the annular tube proximate the outlet end; at least one primary fuel injector, the primary fuel injector dispersing fuel into a fluid stream entering the annular tube via the fluid inlet; and at least one secondary fuel injector, the secondary fuel injector disposed in the annular tube.

13 Claims, 4 Drawing Sheets

(56) References Cited

U.S. PATENT DOCUMENTS

| | | | |
|---|---|---|---|
| 5,857,339 A * | 1/1999 | Roquemore | F23R 3/20 60/749 |
| 5,862,668 A * | 1/1999 | Richardson | F23R 3/50 60/737 |
| 6,112,512 A | 9/2000 | Miller et al. | |
| 6,442,930 B1 | 9/2002 | Johnson et al. | |
| 6,526,936 B2 | 3/2003 | Nalim | |
| 6,550,235 B2 | 4/2003 | Johnson et al. | |
| 6,883,302 B2 | 4/2005 | Koshoffer | |
| 6,926,231 B2 | 8/2005 | Ouellette et al. | |
| 7,198,234 B2 | 4/2007 | Saddoughi | |
| 8,192,688 B2 * | 6/2012 | Hagen | F23R 3/28 60/746 |
| 8,683,780 B2 | 4/2014 | Shimo et al. | |
| 8,887,482 B1 | 11/2014 | Ruggeri et al. | |
| 8,931,518 B2 | 1/2015 | Whalen | |
| 9,816,463 B2 * | 11/2017 | Falempin | F23R 7/00 |
| 2002/0112482 A1 * | 8/2002 | Johnson | F23R 3/16 60/776 |
| 2007/0044476 A1 * | 3/2007 | Koshoffer | F23R 3/20 60/776 |
| 2018/0010800 A1 | 1/2018 | Nagesh | |
| 2018/0179953 A1 | 6/2018 | Tangirala et al. | |
| 2018/0180289 A1 | 6/2018 | Lavertu, Jr. et al. | |
| 2018/0231256 A1 | 8/2018 | Pal et al. | |
| 2018/0274787 A1 * | 9/2018 | Greene | F02C 5/02 |
| 2018/0274788 A1 * | 9/2018 | Greene | F02C 5/02 |

* cited by examiner

FUEL STAGING FOR ROTATING DETONATION COMBUSTOR

BACKGROUND

The present subject matter relates generally to a combustor of an engine, such as a rotating detonation engine.

A rotating detonation engine includes an annulus with an inlet end through which a fuel and air mixture enters and an outlet end from which exhaust exits. A detonation wave travels in a circumferential direction of the annulus and consumes the incoming fuel and air mixture. The burned fuel and air mixture (e.g., combustion gases) exits the annulus and is exhausted with the exhaust flow.

The detonation wave provides a high-pressure region in an expansion region of the combustion system. Rotating detonation pressure gain combustion systems are expected to operate at much higher frequencies than other pressure gain combustion concepts, such as pulse detonation combustors.

Maintaining a rotating detonation wave within rotating detonation combustors during low power conditions of the engines, as well as selectively controlling and/or adjusting the operating conditions present technical challenges. For example, when a rotating detonation engine is operating at an idle condition (e.g., not generating enough propulsive force to propel the engine or a vehicle that includes the engine), the detonations rotating within the combustor of the engine may dissipate or be extinguished.

BRIEF DESCRIPTION OF THE EMBODIMENTS

Aspects of the present embodiments are summarized below. These embodiments are not intended to limit the scope of the present claimed embodiments, but rather, these embodiments are intended only to provide a brief summary of possible forms of the embodiments. Furthermore, the embodiments may encompass a variety of forms that may be similar to or different from the embodiments set forth below, commensurate with the scope of the claims.

In one aspect, a combustion system includes an annular tube disposed between an inner wall and an outer wall, the annular tube extending from an inlet end to an outlet end; at least one fluid inlet disposed in the annular tube proximate the inlet end, the fluid inlet providing a conduit through which fluid flows into the annular tube; at least one outlet disposed in the annular tube proximate the outlet end; at least one primary fuel injector, the primary fuel injector dispersing fuel into a fluid stream entering the annular tube via the fluid inlet; and at least one secondary fuel injector disposed in the annular tube.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
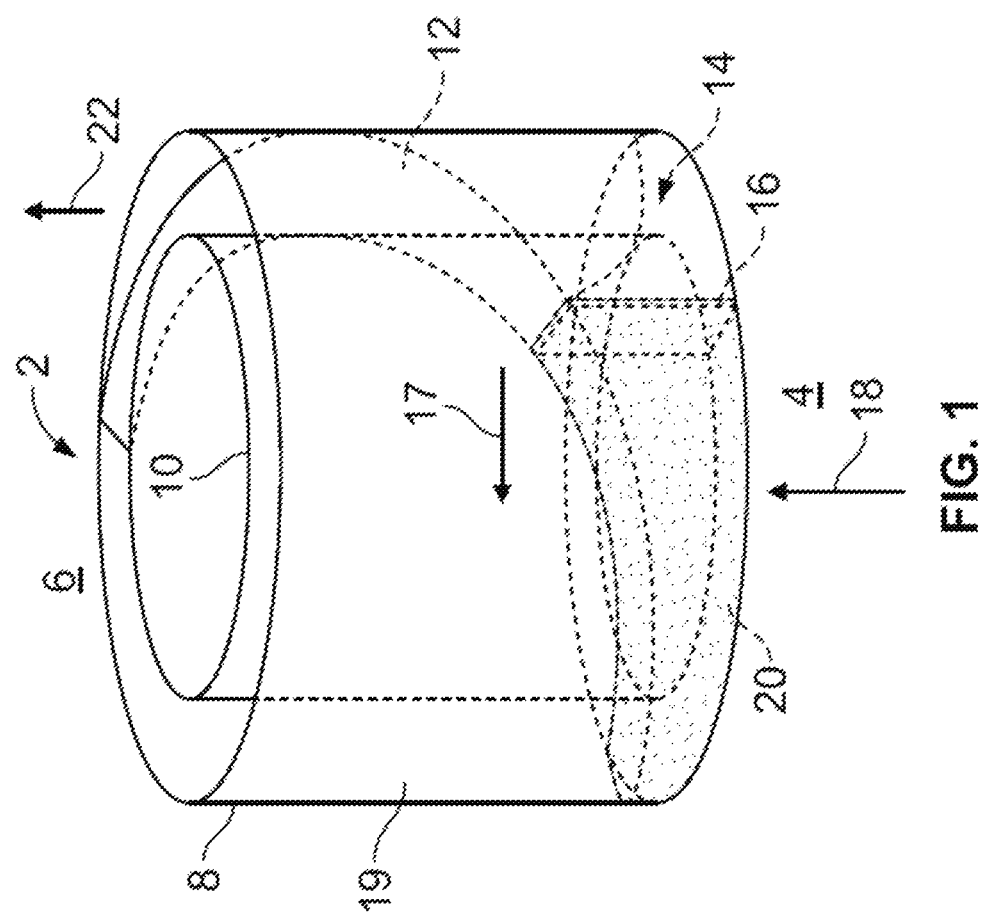
FIG. 1 is a perspective schematic representation of a rotating detonation combustor.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "axial" refers to a direction aligned with a central axis or shaft of a gas turbine engine or alternatively the central axis of a propulsion engine, a combustor, and/or internal combustion engine. An axially forward end of the gas turbine engine or combustor is the end proximate the fan, compressor inlet, and/or air inlet where air enters the gas turbine engine and/or the combustor. An axially aft end of the gas turbine engine or combustor is the end of the gas turbine or combustor proximate to the engine or combustor exhaust where combustion gases exit the engine or combustor. In non-turbine engines, axially aft is toward the exhaust and axially forward is toward the inlet.

As used herein, the term "circumferential" refers to a direction or directions around (and tangential to) the circumference of an annulus of a combustor, or for example the circle defined by the swept area of the turbine blades. As used herein, the terms "circumferential" and "tangential" are synonymous.

As used herein, the term "radial" refers to a direction moving outwardly away from the central axis of the gas turbine, or alternatively the central axis of a propulsion engine. A "radially inward" direction is aligned toward the central axis moving toward decreasing radii. A "radially outward" direction is aligned away from the central axis moving toward increasing radii.

FIG. 1 illustrates a schematic diagram of one example of a rotating detonation combustor 2. The combustor 2 includes an annular combustor formed from an outer wall 8 and an inner wall 10. The combustor that is defined by the walls 8, 10 has an inlet end 4 (in which a fuel/air mixture 18 enters) and an outlet end 6 from which an exhaust flow 22 exits the combustor 2. A detonation wave 16 travels in a circumferential direction 17 of the annulus (and around an annular axis of the annulus), thereby consuming the incoming fuel/air mixture 18 and providing a high-pressure region 14 in an expansion region 12 of the combustion 2. The burned fuel/air mixture (e.g., combustion gases) 19 exit the annulus and are exhausted as the exhaust flow 22. The region 20 behind the detonation wave 16 has very high pressures, and this pressure can feed back into an upstream chamber from which the air and fuel are introduced and form an unburnt fuel/air mixture 18. Synchronized and/or sequential injection of the fuel into the combustor 2 may aid in reducing or eliminating unburnt fuel and air.

Figure 2:
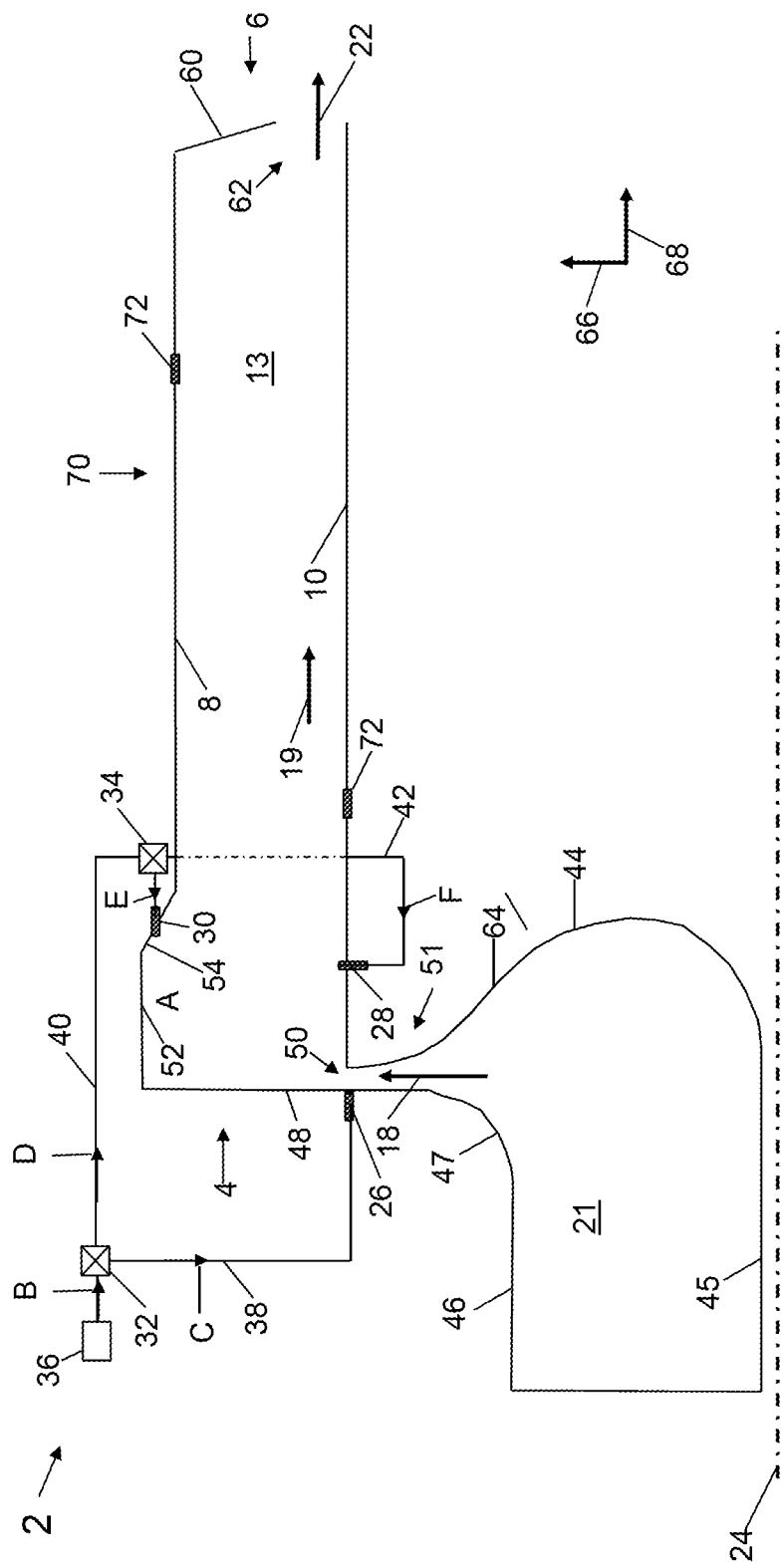
FIG. 2 is a side schematic representation of a rotating detonation combustor.

FIG. 2 illustrates a side view of a rotating detonation combustor 2 according to the embodiments disclosed herein. The combustor 2 includes a combustion tube (or annular tube) 70 extending between an inlet end 4 and an outlet end 6. The inlet end 4 includes a combustor forward wall 48 while the outlet end 6 includes a combustor aft wall 60. An annulus 13 is defined between the inner wall 10, the outer wall 8, the combustor forward wall 48, and the combustor aft wall 60. The annulus 13 is an annular ring, axisymmetric about a combustor centerline 24. A side view of the annulus 13 is depicted in FIG. 2, however, the annulus 13 extends circumferentially 360 degrees about the combustor centerline 24. The combustor centerline 24 may be colinear and/or overlapping with an engine centerline. An incoming fluid 18 (i.e., air, oxidizer, and/or fuel/air mixture) enters the annulus 13 at an air inlet 50 proximate the inlet end 4. At least one igniter (not shown) may be disposed in the inner wall 10 and/or at the outer wall 8 at the inlet end 4 of the combustor 2, for igniting the fuel/air mixture 18. A combustor exhaust 62 is disposed at an axially downstream end of the annulus 13 proximate the outlet end 6. Combustion gas 19 travels in an axially aft and circumferential direction toward the outlet end 6, where exhaust gas 22 is dispersed through the combustor exhaust 62.

FIG. 2 illustrates an axial direction 68 and a radial direction 66. The axial direction 68 illustrated in FIG. 2 is oriented in an axially aft direction, while the radial direction 66 is oriented in a radially outward direction. An axially forward direction (not shown) is the opposite direction of the axial direction 68 (or axially aft direction) illustrated in FIG. 2. Similarly, a radially inward direction (not shown) is the opposite direction of the radial direction 66 (or radially outward direction) illustrated in FIG. 2. A circumferential or tangential direction is into or out of the plane of the figure (i.e., "into the page") and is orthogonal to both the radial and axial directions. An air inlet plenum 21 is coupled fluidly upstream of the air inlet 50, for delivering air, oxidizer, fluids, and/or fuel-air mixtures to the annulus 13. The air inlet plenum 21 may also be described as a fluid inlet plenum 21 because according to the embodiments described herein, fluids other than air may flow through the fluid/air inlet plenum 21. The air inlet plenum 21 receives a working fluid (air, an oxidizer, and/or fuel-air mixtures) from an air supply or oxidizer supply (not shown). The air and/or oxidizer may be pressurized prior to entering the air inlet plenum 21 via a compressor (not shown), ram effects, and/or via other means.

The air inlet plenum 21 is defined within a first sidewall 46 (that defines a radially outer boundary of the air inlet plenum 21), a second sidewall 45 (that defines a radially inner boundary of the air inlet plenum 21), and a plenum backwall 44 which defines an axially aft boundary of the air inlet plenum 21. Each of the first and second sidewalls 45, 46 are oriented in an axial or substantially axial direction.

The plenum backwall 44 transitions the air inlet plenum 21 from an axial direction 68 to a radial direction 66 at a location that is approximately equidistance between the first and second sidewalls 45, 46. The plenum backwall 44 includes a curved or contoured surface which, at a radially inward portion, is concave toward an axially forward end of the air inlet plenum 21. The contouring of the plenum backwall 44 gradually transitions from a pure axial orientation at the second side wall 45 to a pure radial direction at the combustor centerline 24. The contouring of the plenum backwall 44 continues to be concave toward an axially forward end of the combustor, past the radial direction such that the plenum backwall 44 curves back toward an axially forward end of the air inlet plenum 21. The plenum backwall 44 reaches an inflection point 64 where the curvature begins to curve back toward a pure radial direction. The plenum backwall 44 is oriented in a pure radial direction at the intersection with the annulus inner wall 10, which also coincides with the radial location of a minimum flow area of the air inlet 50.

Referring still to FIG. 2, the air inlet plenum 21 includes a transition portion 47 which forms a transition from the first sidewall 46 to the combustor forward wall 48. The combustor forward wall 48 may be oriented in a radial or substantially radial direction. The transition portion 47 includes contouring that curves from an axial direction at the intersection with the first sidewall 46, to a radial direction at the intersection with the combustor forward wall 48. Inlet air (or oxidizer and/or other fluid) 18 may be travelling in an axial direction at an axially forward portion of the air inlet plenum 21. The direction of the inlet air (or oxidizer or other fluid) 18 flowing through the air inlet plenum 21 may transition from an axial direction 68 to a radial direction 66 (with a possible component of the airflow direction in the circumferential direction as well) as the air approaches the air inlet 50. The radially outer portions of each of the transition portion 47 and the plenum backwall 44 collectively form a throat portion 51 through which air and/or oxidizer (or other fluid) flows prior to entering the annulus 13 via the air inlet 50. The throat portion 51 may include a smaller flow area than both the air inlet plenum 21 and the annulus 13. The embodiment of FIG. 2 illustrates the combustor 2 including a radial air inlet 50, because air (and/or oxidizer) travels radially outward from the plenum 21 into the annulus 13. However, in other configurations of the present claimed embodiments, the combustor 2 may include an axial inlet where air enters the annulus 13 at an axially forward end while travelling in an axial direction. (For example, in an axial inlet configuration, the air inlet 50 may be disposed within the combustor forward wall 48).

Still referring to FIG. 2, one or more primary fuel injectors 26 may be disposed in the combustor forward wall 48 at a radial location corresponding to the air inlet 50. The one or more primary fuel injectors 26 may be disposed in the combustor forward wall 48 at a location that is approximately axially forward of the inner wall 10. The primary fuel injector 26 disperses fuel into the inlet air 18 as inlet air enters the combustor tube 70 at the air inlet 50. The primary fuel injector 26 disperses fuel in an axial direction, orthogonal to the direction of the inlet air, which flows into the annulus in a radially outward direction. A first fuel line 38 is fluidly coupled to the one or more primary fuel injectors 26 for delivering fuel to the one or more primary fuel injectors 26. A first fuel control valve 32 is fluidly coupled upstream of the first fuel line 38. A fuel supply 36 is fluidly coupled upstream of the first fuel control valve 32.

The combustor 2 includes a hood portion A. The hood portion A is defined by the radially outer portion of the combustor forward wall 48, a hood outer wall 52, which is axially aligned and coupled to the radially outer portion of the combustor forward wall 48, and a hood taper portion 54, which extends both axially aft and radially inward and forms a transition between the hood outer wall 52 and the outer wall 8 of the combustor tube (or annular tube) 70. In one embodiment, the hood taper portion 54 may be oriented at an angle between about 15 degrees and about 60 degrees from the axial direction. In another embodiment, the hood taper portion 54 may be oriented at an angle between about 20 degrees and about 50 degrees from the axial direction. In another embodiment, the hood taper portion 54 may be oriented at an angle between about 30 degrees and about 45 degrees from the axial direction. In another embodiment, the hood taper portion 54 may be oriented at an angle between about 35 degrees and about 40 degrees from the axial direction.

Referring still to FIG. 2, one or more secondary fuel injectors 30 may be disposed within the hood taper portion 54 for dispersing fuel into the hood portion A. Whereas the primary fuel injector 26 may be oriented such that it disperses fuel into the annulus 13 in an axially downstream direction (i.e., toward the combustor exhaust 62), the secondary fuel injector 30 may be oriented such that it disperses fuel into the annulus 14 in an axially upstream direction (i.e., toward the combustor forward wall 48). The one or more secondary fuel injectors 30 may be fluidly coupled to a second fuel control valve 34. A second fuel line 40 may be fluidly coupled upstream of the second fuel control valve 34, and downstream of the first control valve 32.

The combustor 2 may also include one or more tertiary fuel injectors 28 disposed in the inner wall 10 at a location axially aft (or downstream) of the air inlet 50. The one or more tertiary fuel injectors 28 may be fluidly connected to a third fuel line 42 which in turn may be fluidly coupled to the second fuel control valve 34. The one or more tertiary fuel injectors may be oriented such that they disperse fuel into the annulus 13 in a radially outward direction (i.e., towards the hood outer wall 52 and/or towards the outer wall of the combustor tube 70). The primary, secondary, and tertiary fuel injectors 26, 30, 28 may each be disposed in a single location (as shown in the cross-sectional side view of FIG. 2) and may also be disposed in multiple locations, circumferentially spaced around the combustor 2 in locations corresponding to their respective axial and radial locations shown in FIG. 2.

In operation, a total fuel flow B may flow between the fuel supply 36 and the first fuel control valve 32. The first fuel control valve 32 may control a first fuel flow C to the first fuel line 38 and a second fuel flow D to the second fuel line 40. The second control valve 34 receives the second fuel flow D and may control and/or direct a third fuel flow E to the secondary fuel injector 30, and a fourth fuel flow F to the third fuel line 42. In the arrangement described above and illustrated in FIG. 2, the fourth fuel flow F and the third fuel flow E added together equal the second fuel flow D while the second fuel flow D and the first fuel flow C added together equal the total fuel flow B.

The first, second, and third fuel lines 38, 40, 42, as well as the first and second fuel control valves 32, 34 may be arranged in other suitable configurations than the embodiment illustrated in FIG. 2. For example, the third fuel line 42 may be fluidly coupled to a third fuel control valve (i.e., a dedicated fuel control valve for the tertiary fuel injector 28), which in turn is fluidly couple directly to the fuel supply 36. Similarly, the second fuel line 40 may be coupled directly to the fuel supply, rather than being fluidly coupled downstream of the first fuel control valve 42. The third fuel line 42 may be routed to the tertiary fuel injector 28 through a strut (not shown) that transects and/or traverses the annulus 13. Alternatively, the third fuel line 42 may be routed through or around the air inlet plenum 21, the transition portion 47, the plenum backwall 44, and/or the throat portion 51. Each of the first and second fuel control valves 32, 34 (as well as the third fuel control valve (not shown) discussed above) may be three-way valves capable of routing flow to either downstream fuel line individually and/or simultaneously. For example, in operation, the first fuel control valve 32 may route fuel to both the first and second fuel lines 38, 40, to neither the first or second fuel lines 38, 40, to only the first fuel line 38, and/or to only the second fuel line 40.

Referring still to FIG. 2, the combustor aft wall 60 may be oriented in a radial direction and/or may be oriented to have components in both the radial and axial directions, as illustrated in FIG. 2. For example, the combustor aft wall 60 may be oriented from about 0 to about 30 degrees from a radial direction. In other embodiments, the combustor aft wall 60 may be oriented from about 5 to about 25 degrees from a radial direction. In other embodiments, the combustor aft wall 60 may be oriented from about 10 to about 20 degrees from a radial direction. In other embodiments, the combustor aft wall 60 may be oriented from about 12 to about 18 degrees from a radial direction. The combustor aft wall 60, in concert with the aft end of the inner wall 10, forms the combustor exhaust 62, through which the exhaust flow 22 flows. The combustor exhaust 62 is disposed in a radial gap between the radially inner end of the combustor aft wall 60 and the axially aft end of the inner wall 10. The radial gap extends 360 degrees around the annular combustor 2, axisymmetric or substantially axisymmetric about the combustor centerline 24. The radial gap that defines the combustor exhaust 62 may span a greater linear distance than the axial gap that the defines the air inlet 50. Similarly, the flow area of the combustor exhaust 62 may be greater than the flow area of the air inlet 50.

The combustor 2 may include at least one ion probe and/or dynamic pressure sensor 72 disposed in the inner wall 10, the combustor forward wall 48, the combustor aft wall 60, the hood outer portion 52, the hood taper portion 54, and/or the outer wall 8. The at least one dynamic pressure sensor 72 may be used to sense when pressure waves resulting from the rotating detonation are passing by. The one or more dynamic pressure sensor(s) 72 may provide real-time or near real-time feedback that may be used by a control system to time, synchronize, and/or control when each of the primary, secondary and tertiary fuel injectors 26, 30, 28 disperse fuel into the annulus 13.

In operation, the hood portion A may be used as a detonation emphasis zone, where each of the primary, secondary and tertiary fuel injectors are configured to direct fuel. In the case of the primary fuel injector 26, which is not oriented toward the hood portion A, inlet air 18 may carry fuel from the one or more primary fuel injectors 26 to the hood portion A (i.e., inlet air 18 carries fuel from the primary fuel injector 26 radially outward toward the hood portion A). Each of the primary, secondary and tertiary fuel injectors 26, 30, 28 may disperse fuel through holes and/or orifices that are circular, elliptical, slotted, and/or other suitable shapes. A minimum dimension (i.e., diameter, width, minor axis, etc.) of the holes and/or orifices in each of the primary, secondary and tertiary fuel injectors 26, 30, 28 may be from about 3 to about 30 mils (i.e., thousandths of an inch). In other embodiments, the minimum dimension of the holes and/or orifices may be from about 5 to about 20 mils. In other embodiments, the minimum dimension of the holes and/or orifices may be from about 8 to about 17 mils. In other embodiments, the minimum dimension of the holes and/or orifices may be from about 10 to about 15 mils. In another embodiment, the holes and/or orifices disposed within the secondary fuel injector 30 may have a smaller diameter and/or minimum dimension than those of the primary fuel injector 26. In another embodiment, there may be fewer holes and/or orifices disposed within the secondary fuel injector 30 than in the primary fuel injector 26.

A rotating detonation wave resulting from combustion of a fuel-air mixture from the one or more primary fuel injectors 26 and/or air inlet 50 may travel circumferentially around the combustor 2 as it travels the axial length of the combustor tube (or annular tube) 70, from the inlet end 4 to the outlet end 6. The magnitude of the rotating detonation wave may begin to dissipate as it propagates circumferentially and axially through the combustor 2. As such, fuel dispersed through the one or more secondary fuel injectors 30 may ignite and strengthen the rotating detonation wave. Similarly, fuel dispersed through the one or more tertiary fuel injectors 28 may ignite and strengthen the rotating detonation wave. Fuel dispersed through each of the primary, secondary, and tertiary injection locations 26, 30, 28 may be timed and/or synchronized such that each additional dispersal of fuel enters the annulus 13 at the precise instant in which it would serve to enhance and/or augment the magnitude of the rotating detonation wave or waves. The one or more dynamic pressure sensors 72 may be used in a feedback loop to quantify and/or adjust the impact on the rotating detonation wave or waves that results from each dispersal of fuel from the primary, secondary, and tertiary injection locations 26, 30, 28. In addition, the one or more dynamic pressure sensors 72 may be spaced circumferentially, axially, and/or radially around the annular combustor 2 such that data pertaining to at least one characteristic of each rotating detonation wave may be acquired as each rotating detonation wave propagates axially and circumferentially through the annular combustor 2.

As rotating detonation waves propagate circumferentially and axially through the annular combustor 2, the localized pressure at each surface in the vicinity increases. For example, a rotating detonation wave propagating in the vicinity of the hood portion A will cause an increase in the pressure at each of the hood outer wall 52, the hood taper portion 54 and the combustor forward wall 48. These localized pressure increases will then be followed by a drop in localized pressure as the rotating detonation wave dissipates. As the pressure is dropping, fuel may be dispersed at the secondary fuel injection location 30 (or the tertiary and/or primary fuel injection locations 28, 26), thereby augmenting the rotating detonation wave and temporarily increasing the localized pressure. The secondary fuel injector 30 and/or the second fuel control valve 34 may include a spring-loaded valve or other mechanism that opens and closes based on the localized pressure within the annulus (i.e., at the hood portion A), thereby dispersing fuel into the annulus 13 when the pressure drops due to a rotating detonation wave having passed by. The secondary fuel injector 30 (as well as the primary fuel injector 26 and the tertiary fuel injector 28) may be actively and/or passively controlled and may be pressure driven and/or controlled based on factors such as internal temperatures within the annulus, the desired operating conditions, air flow rates, fuel flow rates, as well as other conditions. Stated otherwise, the secondary fuel injector 30 (as well as the primary fuel injector 26 and the tertiary fuel injector 28) may be a pressure driven fuel injector and may control the flow of fuel into the annular tube 70 based at least partially on a pressure within the annular tube (among other factors).

At least one fuel manifold (not shown) may be disposed at each of the primary, secondary, and tertiary fuel locations 26, 30, 28 for controlling the flow of fuel into each. For example, embodiments disclosed herein may include 50, 80, 100 or some other number of fuel injectors and/or fuel holes (i.e., holes through which fuel flows into the annulus 13) at each of the primary, secondary, and tertiary fuel injection locations 26, 30, 28. The fuel injectors and/or fuel holes may be circumferentially spaced around the annular combustor 2. Each fuel manifold may be disposed around the respective pluralities of holes and/or injectors (for example, radially inward of the tertiary fuel injection location 28, axially forward of the primary fuel injection location 26, and/or axially aft of the secondary fuel injection location 30), such that each fuel manifold delivers fuel to each of the pluralities of holes and/or injectors. Each of the pluralities of holes and/or injectors may be selectively opened and/or activated to flow fuel in order to achieve one or more desired operating conditions. For example, during startup, only 20% of the holes and/or injectors may be activated to flow fuel at each of the primary, secondary, and tertiary fuel locations 26, 30, 28, while at a high-power condition 80% or more of the holes and/or injectors may be activated. In addition, the holes and/or injectors may be activated in an asymmetric fashion (i.e., only a subset of circumferential locations and/or clock positions) to achieve a desired operating condition such as thrust vectoring and/or downstream flow control actuation. Similarly, each of the holes and/or injectors at each of the primary, secondary, and tertiary fuel locations 26, 30, 28 may be configured to flow a partial fuel flow (i.e., more than 0 but less than a maximum allowable flow rate through each hole and/or injector).

The primary, secondary, and tertiary fuel injection locations 26, 30, 28 may all be activated concurrently during some operating conditions according to the present embodiment while during other operating conditions, each of the primary, secondary, and tertiary fuel injection locations 26, 30, 28 may all be activated individually. In addition, each of the primary, secondary, and tertiary fuel injection locations 26, 30, 28 may all be partially activated and or fully activated under various operating conditions. Similarly, one or more of the primary, secondary, and tertiary fuel injection locations 26, 30, 28 may be inactive while the remaining fuel injection locations are activated and/or partially activated. Each of the primary, secondary, and tertiary fuel injection locations 26, 30, 28 may include multiple axial and/or radial injection locations, in addition to the multiple circumferential locations. For example, a second tertiary fuel injector may be disposed in the inner wall 10 axially aft of the tertiary fuel injector 28. Similarly, a second primary fuel injector may be disposed within the combustor forward wall 48 radially outward of the primary fuel injector 26. Similarly, a second secondary fuel injector may be disposed in the hood outer wall 52, and/or in the hood taper portion 54.

Figure 3:
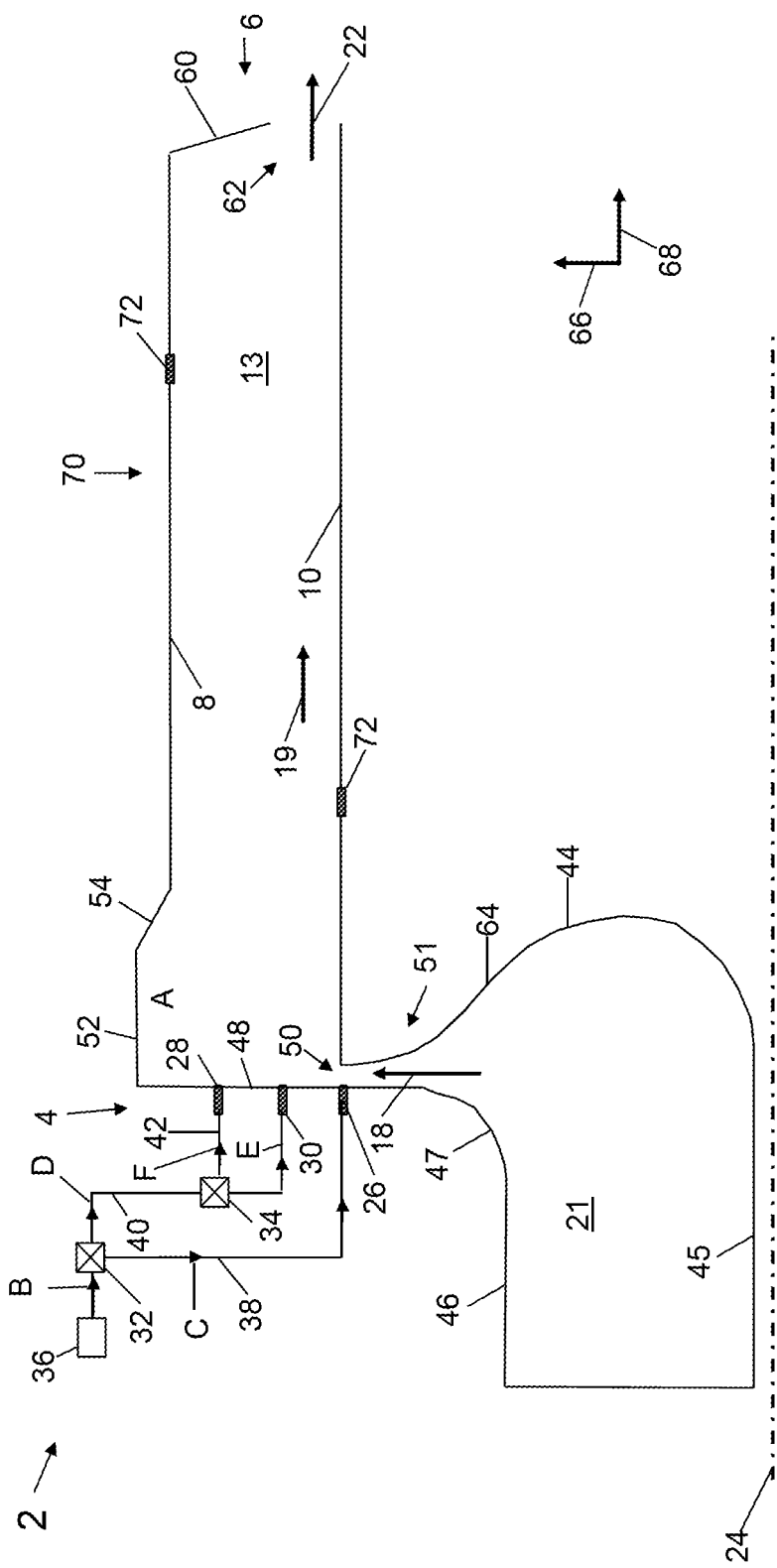
FIG. 3 is a side schematic representation of a rotating detonation combustor.

FIG. 3 illustrates a side view of a rotating detonation combustor 2 according to the embodiments disclosed herein. The combustor 2 includes a combustion tube (or annular tube) 70 extending between an inlet end 4 and an outlet end 6, similar to the embodiment of FIG. 2. In the embodiment of FIG. 3, the primary, secondary, and tertiary fuel injectors 26, 30, 28 are all disposed in the combustor forward wall 48.

Each of the primary, secondary, and tertiary fuel injectors 26, 30, 28 disperse fuel into the annulus 13 toward the outlet end 6. In the embodiment of FIG. 3, the secondary fuel injector 30 is radially outward of the primary fuel injector 26, while the tertiary fuel injector 28 is radially outward of the secondary fuel injector 30. In other arrangements of the embodiments disclosed herein, the primary fuel injector 26 may be radially outward of the secondary and/or the tertiary fuel injectors 30, 28. Similarly, in other arrangements of the embodiments disclosed herein, the secondary fuel injector 30 may be radially outward of and/or radially inward of the tertiary fuel injector 28.

Figure 4:
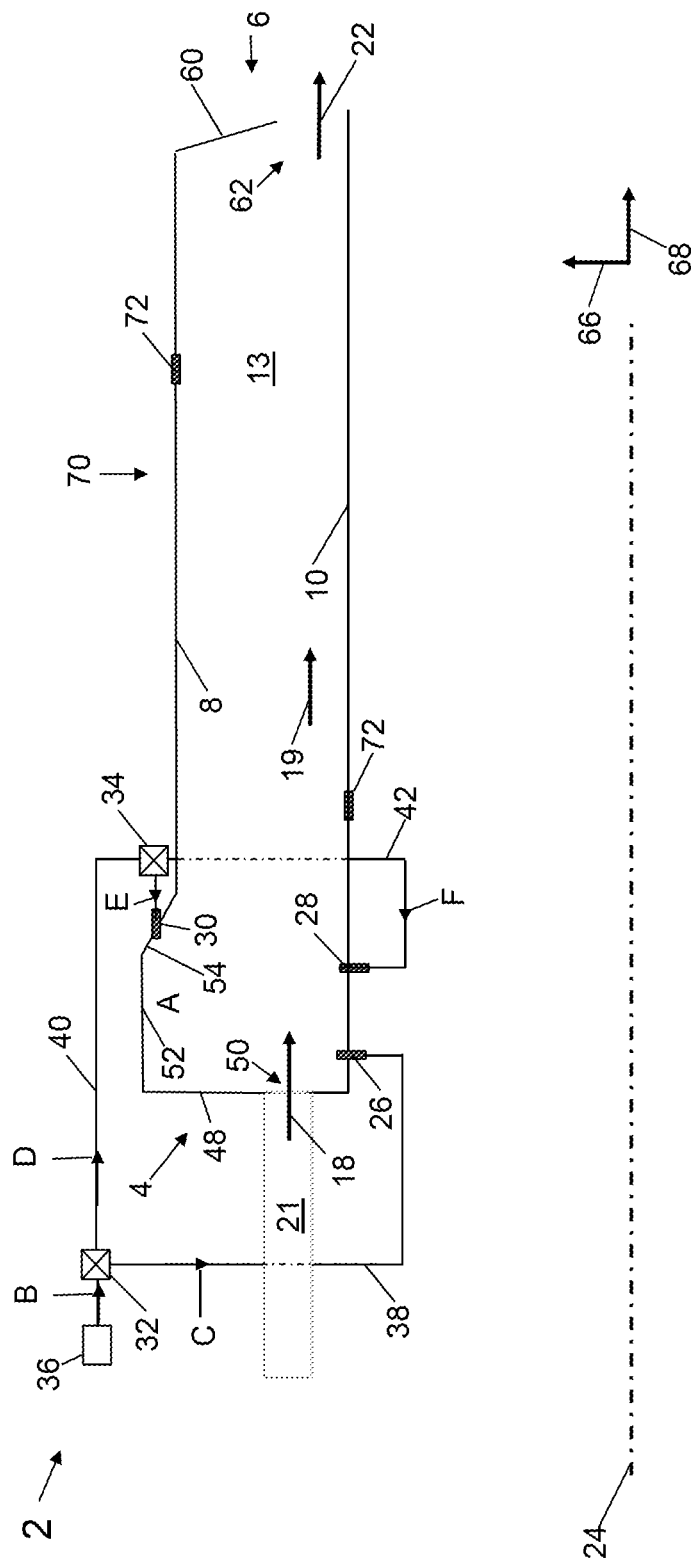
FIG. 4 is a side schematic representation of a rotating detonation combustor, according to aspects of the present embodiments.

FIG. 4 illustrates a side view of a rotating detonation combustor 2 according to the embodiments disclosed herein. The combustor 2 includes a combustion tube (or annular tube) 70 extending between an inlet end 4 and an outlet end 6, similar to the embodiments of FIGS. 2 and 3. In the embodiment of FIG. 4, the combustor 2 includes an axial inlet 21 which disperses a fluid flow 18 (such as air and/or oxidizer) into the annulus 13 via an opening 50. In the embodiment of FIG. 4, the inlet flow 18 travels axially from the axial inlet 21 (which is disposed axially forward of the combustor tube 70) into the combustor annulus 13. The inlet 50 may be disposed in the combustor forward wall 48. The primary fuel injector 26 may be disposed in the inner wall 10 and may be oriented such that it disperses fuel into the annulus 13 in a radially outward direction. In the embodiment of FIG. 4, fuel dispersed into the annulus 13 by the primary fuel injector 26 intersects and mixes with a fluid stream (i.e., inlet flow 18) entering the annulus 13 via the inlet 50. In each of the embodiments disclosed herein, each of the primary, secondary, and tertiary fuel injectors 26, 30, 28, as well as the first, second, and third fuel lines 38, 40, 42, and the first and second fuel control valves 32, 34 may be arranged in different configurations than those illustrated herein. For example, each of the primary, secondary, and tertiary fuel injectors 26, 30, 28 may be disposed in the inner wall 10, the outer wall 8, the combustor forward wall 48, the hood outer wall 52, and/or the hood taper portion 54, while each of the first, second, and third fuel lines 38, 40, 42 and the first and second fuel control valves 32, 34 may be fluidly coupled and/or arranged in parallel.

In operation, each of the embodiments disclosed herein may include multiple detonation waves simultaneously propagating in a circumferential (and axially aft) direction such that they wrap around the annulus 13 as they move from an inlet end 4 to an outlet end 6. Chemistry and combustor dynamics, as well as other factors, may limit the minimum size of both the combustor 2 as well as the area and/or volume of the annulus 13 due to a minimum amount of time required for the rotating denotation wave to travel around the annulus. As such, the area of the annulus 13, the overall radius of the combustor 2, and/or the overall axial length of the combustor 2 may all be adjusted to ensure the chemistry considerations as well as other factors such as combustor dynamics, aerodynamics, thermal management, and other considerations are all balanced accordingly. In addition, it may be desirable for the combustor 2 to have a non-circular shape in order to increase the distance around the annulus 13 that the rotating detonation wave may travel, while simultaneously allowing the axial length of the combustor 2 to be decreased.

Each of the embodiments disclosed herein may include at least one igniter, at least one radial and/or axial air inlet (as well as inlets that are partially radially, axially and/or tangentially (i.e., circumferentially) aligned), an annular, cylindrical and/or ring-shaped fuel manifold, at least one manifold supply line and/or fluid coupling to each of the first, second, and third fuel supply lines 38, 40, 42, as well as other upstream system components such as an air (or oxidizer) supply, an airflow (or oxidizer flow) control mechanism, as well as other upstream system components. Each of the fuel injectors and/or fuel holes may be spaced and sized to: enhance mixing by increasing mixing resonance time, adapt to varying pressure pulses within the annulus 13 through varying fuel stiffness (varying impedance), ensure proper spatial equivalence ratios to boost pressure gain performance, and/or increase regularity of pressure pulse performance. By progressively injecting fuel at each of the primary, secondary, and tertiary fuel injection locations 26, 30, 28 in a synchronized and/or pressure-controlled fashion, the present embodiments may prevent successive rotating detonation waves from weakening and/or ceasing from detonating entirely. The present claimed embodiments allow equivalence ratios, resonance times, pressure gradients, thermal gradients, as well as other factors to balance throughout the entire volume of the annular combustor 2.

As used herein, "detonation" and "quasi-detonation" may be used interchangeably. Typical embodiments of detonation chambers include a means of igniting a fuel/oxidizer mixture, for example a fuel/air mixture, and a confining chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, autoignition or by another detonation via cross-firing. The geometry of the detonation chamber is such that the pressure rise of the detonation wave expels combustion products out of the detonation chamber exhaust to produce a thrust force, as well as for other purposes such as flow control actuation. In addition, rotating detonation combustors are designed such that a substantially continuous detonation wave is produced and discharged therefrom. Detonation may be accomplished in a number of types of detonation chambers, including detonation tubes, shock tubes, resonating detonation cavities, and annular detonation chambers.

Each of the embodiments disclosed herein include fuel being combusted in the presence of an oxidizer. Fuel mixes with an oxidizer during or prior to the combustion process. The embodiments disclosed herein include air as one possible oxidizer. However, other oxidizers such as straight oxygen (i.e., pure oxygen) are also possible. In various conditions, oxygen may be a preferred oxidizer over air. In other conditions, air may be the preferred oxidizer. As used herein, the terms "oxygen" and "pure oxygen," may include gas that is at least about 80% oxygen by mass. In some embodiments, the oxidizer may be at least about 90% oxygen by mass. In other embodiments, the oxidizer may be about 93% to about 99.3% oxygen by mass. In other embodiments, the oxidizer may be greater than about 99.3% oxygen by mass. (By comparison, air is about 21% oxygen, about 78% nitrogen and about 1% other gases). Other oxidizers other than oxygen and air are also possible. In embodiments that use an oxidizer other than air, those embodiments will include the corresponding system components including, for example, an oxidizer inlet, an oxidizer supply line, an oxidizer supply, an oxidizer flow control mechanism, an oxidizer flow modulator, and/or a second oxidizer inlet.

Each of the embodiments disclosed herein include a source of ignition, which may be in the form of a spark igniter and/or via autoignition (i.e., via heated inner and outer walls 10, 8, heated combustor forward wall 48, hood outer wall 52, and/or hood taper portion 54, which have absorbed heat from the combustion process), as well as via volumetric ignition. Some embodiments may include multiple sources of ignition. For example, in some embodiments, at least one spark igniter may be used during some operating conditions and then ignition may transition to autoignition and/or volumetric ignition at other operating conditions.

The present embodiments include an aircraft, an engine, a combustor, and/or systems thereof which include rotating detonation combustion. The embodiments presented herein operate on a kilohertz range (1000 Hz to 1000 kHz), which is faster than the 100 Hz operating frequency of previous pulse detonation actuators (PDA) and/or pulse detonation engines (PDE). As such, the embodiments presented herein may provide a more continuous and less pulsed combustion gas jet discharging from the combustor exhaust 62 compared to previous pulse detonation actuators (PDA).

The present embodiments offer both high operating frequency and significant control authority, which provides benefits in numerous practical applications, such as engine exhaust thrust vectoring for vehicle control or boundary layer separation control for aircraft lift enhancement and drag reduction. The present embodiments may also be used as enhancements or combustion systems for supersonic and/or hypersonic applications, for example, in scramjet engines. The present embodiments take advantage of a more compact and/or power dense combustion system. The present embodiments may be used as the primary combustion system for engines such as gas turbine engines. The present embodiments may be used as the secondary, tertiary, and/or auxiliary combustion systems for engines such as gas turbine engines, and/or other components of an aircraft or of other applications.

Exemplary applications of the present embodiments may include high-speed aircraft, separation control on airfoils, flame holders, flame stability, augmenters, propulsion, flight stability, flight control as well as other uses.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims and may include other examples that occur to those skilled in the art. Such other examples are intended to be within the scope of the claims if they have structural elements that do not differ from the literal language of the claims or if they include equivalent structural elements with insubstantial differences from the literal language of the claims.

What is claimed is:

1. A combustion system comprising:
   an annular tube disposed between an inner wall and an outer wall, the annular tube extending from an inlet end to an outlet end;
   at least one fluid inlet disposed in the annular tube proximate the inlet end, the at least one fluid inlet providing a conduit through which fluid flows into the annular tube;
   at least one outlet disposed in the annular tube proximate the outlet end;
   at least one primary fuel injector configured to disperse fuel into a fluid stream entering the annular tube via the at least one fluid inlet, the at least one primary fuel injector being configured to disperse the fuel into the annular tube in an orthogonal orientation to the fluid entering the annular tube via the at least one fluid inlet;
   at least one secondary fuel injector disposed in the annular tube;
   at least one tertiary fuel injector disposed in the annular tube axially aft of the at least one primary fuel injector, the at least one tertiary fuel injector comprising multiple tertiary fuel injectors spaced circumferentially around the annular tube;
   a first fuel line fluidly coupled upstream of the at least one primary fuel injector, the first fuel line configured to deliver the fuel to the at least one primary fuel injector;
   a first fuel control valve fluidly coupled upstream of the first fuel line, the first fuel control valve configured to control a first flow of the fuel to the first fuel line;
   a fuel supply fluidly coupled upstream of the first fuel control valve;
   a second fuel line fluidly coupled downstream of the first fuel control valve, the first fuel control valve configured to control a second flow of the fuel to the second fuel line;
   a second fuel control valve fluidly coupled downstream of the second fuel line, the second fuel control valve configured to control a third flow of the fuel to the at least one secondary fuel injector;
   a third fuel line fluidly coupled downstream of the second fuel control valve, the third fuel line fluidly coupled upstream of the at least one tertiary fuel injector, the third fuel line configured to deliver a fourth flow of the fuel to the at least one tertiary fuel injector;
   at least one hood portion disposed at the inlet end of the annular tube, the at least one hood portion comprising:
      a hood outer wall disposed radially outward of the outer wall; and
      a hood taper portion coupled to an aft end of the hood outer wall and extending axially aft and radially inward from the hood outer wall to the outer wall; and
   a fluid inlet plenum fluidly coupled upstream of the at least one fluid inlet, the fluid inlet plenum comprising a contoured plenum backwall that curves from an axial alignment to radial alignment with respect to a central axis of the annular tube.

2. The combustion system of claim 1, wherein the at least one primary fuel injector is configured to disperse the fuel toward the outlet end of the annular tube,
   wherein the at least one secondary fuel injector is configured to disperse the fuel toward the inlet end of the annular tube, and
   wherein the at least one tertiary fuel injector is configured to disperse the fuel in a radially outward direction.

3. The combustion system of claim 1, wherein the at least one primary fuel injector is disposed radially inward of the at least one secondary fuel injector.

4. The combustion system of claim 1, further comprising a combustor forward wall disposed at the inlet end,
   wherein each of the at least one primary fuel injector, the at least one secondary fuel injector, and the at least one tertiary fuel injector is disposed within the combustor forward wall.

5. The combustion system of claim 1, wherein the at least one fluid inlet is at least one of radially aligned with respect to the central axis of the annular tube and axially aligned with respect to the central axis of the annular tube.

6. The combustion system of claim 5, wherein the at least one fluid inlet is radially aligned with respect to the central axis of the annular tube.

7. The combustion system of claim 1, the fluid inlet plenum further comprising:
- a first sidewall axially aligned with respect to a central axis of the annular tube and forming a radially outward boundary of the fluid inlet plenum;
- a combustor forward wall forming an axially forward boundary of the annular tube; and
- a transition portion coupled to an axially aft end of the first sidewall, the transition portion coupled to a radially inner end of the combustor forward wall, the transition portion contouring from an axial direction at an intersection with the first sidewall to a radial direction at an intersection with the combustor forward wall.

8. The combustion system of claim 7, further comprising a throat disposed at the at least one fluid inlet, wherein the contoured plenum backwall and the combustor forward wall collectively define axially aft and axially forward walls of the throat.

9. The combustion system of claim 1, further comprising at least one dynamic pressure sensor disposed in at least one of the inner wall and the outer wall.

10. The combustion system of claim 1, wherein the at least one primary fuel injector comprises multiple primary fuel injectors spaced circumferentially around the annular tube, and
wherein the at least one secondary fuel injector comprises multiple secondary fuel injectors spaced circumferentially around the annular tube.

11. The combustion system of claim 10, further comprising at least one annular fuel manifold fluidly coupled upstream of at least one of the multiple primary fuel injectors and the multiple secondary fuel injectors.

12. The combustion system of claim 11, wherein the at least one annular fuel manifold is configured to control a flow of the fuel through a subset of at least one of the multiple primary fuel injectors and the multiple secondary fuel injectors.

13. The combustion system of claim 1, wherein at least one of the at least one primary fuel injector and the at least one secondary fuel injector further comprises at least one pressure driven fuel injector, and
wherein the at least one pressure driven fuel injector controls a flow of the fuel into the annular tube based at least partially on a pressure within the annular tube.

* * * * *